United States Patent Office 3,392,323
Patented July 9, 1968

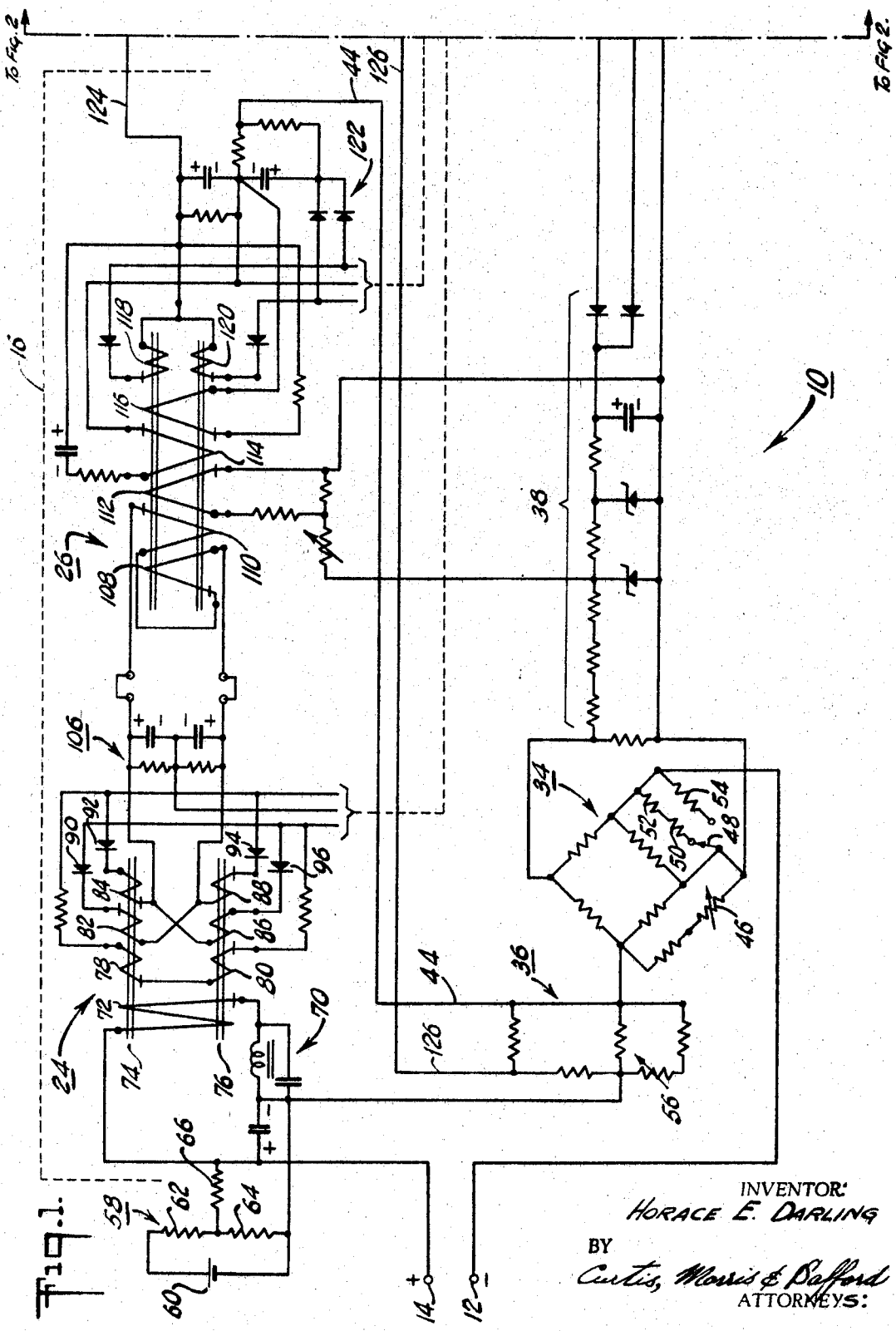

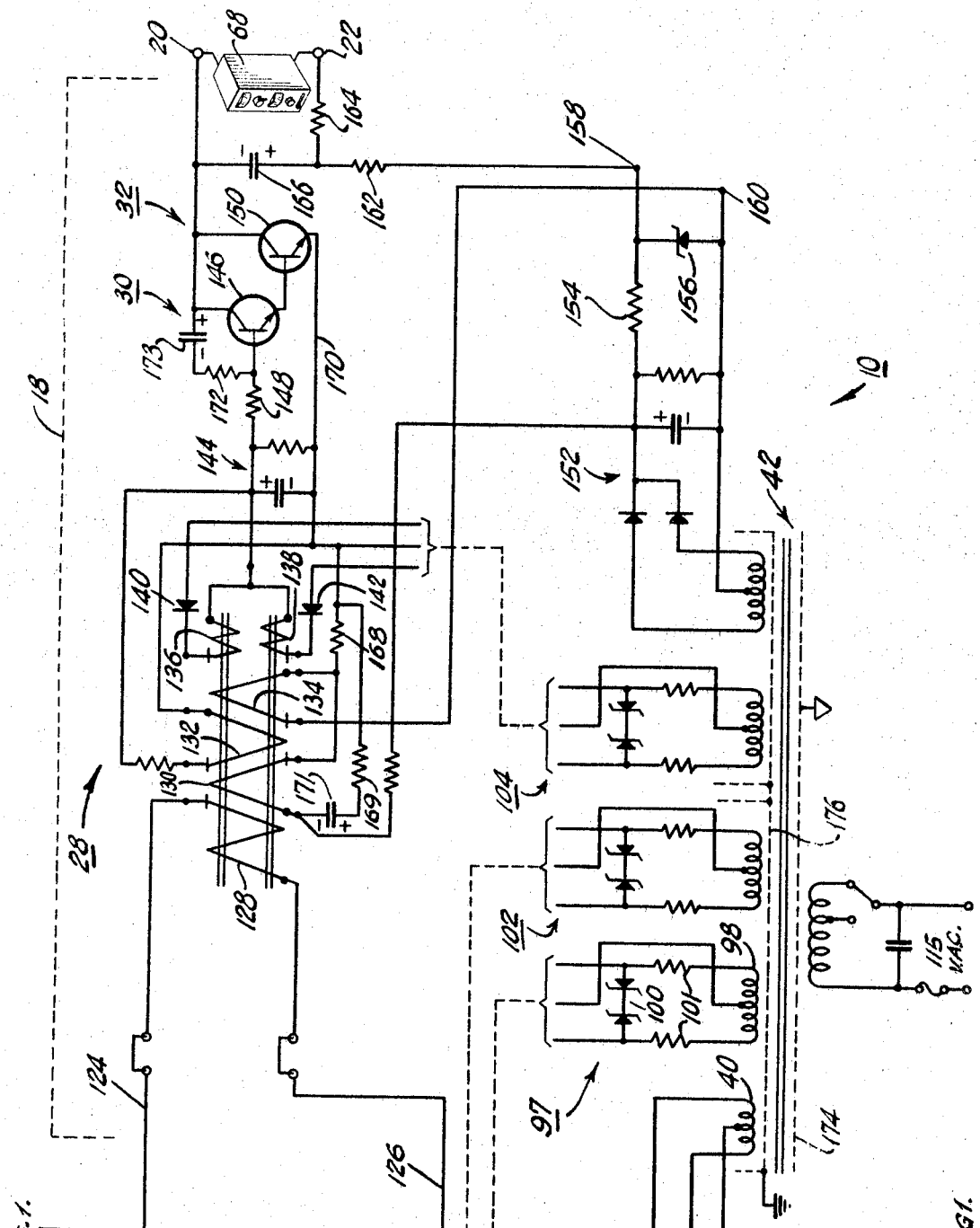

3,392,323
INDUSTRIAL PROCESS SIGNAL-TRANSLATING APPARATUS INCLUDING CONVERSION ELEMENTS AND CASCADED MAGNETIC AMPLIFIERS
Horace E. Darling, North Attleboro, Mass., assignor to The Foxboro Company, Foxboro, Mass., a corporation of Massachusetts
Filed Mar. 31, 1965, Ser. No. 444,347
18 Claims. (Cl. 321—16)

ABSTRACT OF THE DISCLOSURE

A voltage-to-current converter especially adapted for use as a thermocouple transmitter and comprising an amplifier having two cascaded stages, the first stage consisting of two cascaded sub-stages of balanced magnetic amplification and provided with a voltage feedback loop encompassing both sub-stages, the second stage consisting of three cascaded sub-stages of amplification the first of which is a balanced magnetic amplifier and the other two of which are transistor amplifiers, there being provided a current feedback loop encompassing the three sub-stages of the second stage of amplification; the several stages of magnetic amplification are energized by separate clipped sine-wave power supplies; a battery source of D-C power is used as a safeguard in the event of thermocouple burn-out, and selective noise and arc suppression circuits are provided.

---

This invention relates to industrial process measuring apparatus. More particularly, the present invention relates to signal-translating apparatus for converting very low-level electrical measurement signals such as those developed by thermocouples into amplified current signals to be directed to instruments such as recorders and controllers.

In many modern industrial processes it is necessary to control process variables within very narrow limits and thus it is desirable to provide process control and indication equipment which will indicate and correct minute variations in the process variables. For example, it may be necessary to maintain a certain process temperature within very narrow ranges, such as from 750 to 760 degrees Fahrenheit. If a chart-type recorder is used to indicate the temperature variations within that range, the electrical signal input to the chart recorder must vary from a minimum to maximum in response to only 10 degrees temperature change in order to utilize the full scale of the recorder and give maximum magnification of the temperature variations. When the process temperature is measured by a thermocouple, such a small temperature variation produces an exceedingly small difference in the voltage developed by the thermocouple. For example, a variation of 10 degrees Fahrenheit might produce a thermocouple voltage difference of only 0.1 or 0.2 millivolt (thousandths of a volt) and thus for accurate measurement it may be necessary for the apparatus to respond to voltage increments of small fractions of a microvolt (millionth of a volt).

In order to produce enough power to drive the recorder and the other process control equipment for regulating the temperature, these extremely small difference signals must be greatly amplified, and preferably are converted to a corresponding output current. This task is difficult, but it is further complicated by the fact that such low level input signals are of the same order of magnitude as electrical noise signals and the extraneous signals developed by ambient temperature changes.

Another problem in process instrumentation equipment of the type described herein lies in the circuitry usually provided to protect the equipment from damage in case the thermocouple burns out. Prior burn-out protection circuits introduce considerable electrical "noise" (random pulsating voltages) into the electrical circuitry of the equipment, and are subject to failure if the main power supply fails.

Accordingly, one object of the present invention is to provide improved industrial process measuring apparatus capable of converting very low level signals to relatively high-powered output signals. Another object is to provide such apparatus which although having a very high level of amplification is nevertheless relatively insensitive to ambient temperature changes and electrical noise and is extremely stable in operation. A more specific object of the invention is to provide such apparatus for use in converting thermocouple voltage signals into relatively high-power current signals, and to provide easily-maintained, noise-free and reliable means for protecting the amplifier in case the thermocouple burns out.

The specification and drawings that follow describe the invention and indicate some of the ways in which it can be used. In addition, some of the advantages provided by the invention will be pointed out.

In the drawings:
FIGURES 1 and 2 together comprise a schematic circuit diagram of an instrument constructed in accordance with the present invention.

The convertor 10 shown in FIGURES 1 and 2 basically comprises two input terminals 12 and 14, an input amplifier 16, an output amplifier 18 and output terminals 20 and 22. A thermocouple or other low-voltage source is connected to the input terminals, and process instrument equipment 68, which may include a controller and/or a chart recorder, is connected to the output terminals.

The input amplifier 16 consists of a balanced magnetic amplifier stage 24 and a conventional self-saturating magnetic amplifier stage 26. Negative voltage feedback is provided between the output of the second stage 26 and the input of the first stage 24 through lead 44 and feedback network 36. The output amplifier 18 includes another conventional self-saturating magnetic amplifier 28 as a first stage, and second and third stage transistor amplifiers 30 and 32. Negative current feedback is provided between the output of the last stage 32 and a feedback winding 134 of the magnetic amplifier first stage 28. With this arrangement of individual feedback loops for amplifiers 16 and 18, there is no conductive path between the output terminals 20 and 22 of the amplifier 10 and its input terminals 12 and 14.

A voltage converter similar to the device disclosed herein is shown in my U.S. Patent 3,016,493, assigned to the same assignee as this application. The present invention represents a significant improvement over the instrument disclosed in that prior patent. It operates stably and with great accuracy with extremely small input signals, and has other advantages which are discussed in or apparent from the description given hereinbelow.

Now considering the converter 10 in greater detail, the thermocouple is connected in series with an "elevation" bridge network 34 and a voltage-dividing feedback network 36. Elevation bridge network 34 and feedback network 36 are connected in series with the thermocouple and in parallel with a thermocouple burn-out-protection circuit 58. Networks 34 and 36 supply D.C. voltage signals opposite in polarity to the thermocouple voltage and the voltage supplied by the burn-out protection circuit 58. The "elevation voltage" supplied by the bridge 34 is adjusted so that with a preselected minimum temperature being measured, the algebraic sum of the thermocouple, bridge, burn-out-protection, and feedback network voltages is zero, thus providing "zero" input signal to the amplifier 10. As the temperature measured increases above this "zero" level, the converter 10 greatly amplifies and converts the input voltage increment into a current signal which drives the control equipment 68 connected to output terminals 20 and 22. Typically, the control equipment is adapted to correct process temperature deviations and record the temperature variations with respect to time.

Elevation bridge 34 is supplied from an ordinary regulated and temperature-compensated D.C. supply network 38 which is energized from a secondary winding 40 (see FIGURE 2) of a power transformer 42. Feedback network 36 is supplied with a negative DC voltage feedback signal from magnetic amplifier 26.

The voltage provided by the bridge 34 may be adjusted by means of a zero-adjusting resistor 46 in one branch of the bridge circuit. A switch 48 is provided in another branch of bridge circuit 34 to connect into that branch either a series combination of an ordinary resistor 50 and a temperature-sensitive nickel resistor 52 (as shown in FIGURE 1) or an ordinary resistor 54 without temperature compensation. Switch 48 is connected to resistors 50 and 52 when a thermocouple is connected to input terminals 12 and 14 so as to provide ambient temperature compensation for the thermocouple, and is connected to resistor 54 when an ordinary low-level signal source is applied to terminals 12 and 14 and temperature compensation is not needed.

A variable "span" resistor 56 is provided in feedback network 36. Resistor 56 is adjustable to vary the effective resistance of feedback network 36, and thus vary the magnitude of the feedback voltage. The "span" resistor 56 serves as a sensitivity adjustment device for the conveter 10 and controls the range or "span" of temperatures corresponding to full-scale operation of the instrument.

Burn-out protection circuit 58 is energized by a mercury-cadmium cell 60 connected in series with a voltage-divider network consisting of resistors 62 and 64 together with a large series resistor 66 connected between resistors 62 and 64 and to input terminal 14. Burn-out protection circuit 58 thus applies a small fraction of the voltage of the mercury-cadmium-cell 60 between terminals 12 and 14.

If the thermocouple burns out, an open circuit will occur between input terminals 12 and 14. Thus, the bucking voltages supplied by bridge network 34 and feedback network 36 no longer will be applied to the input of amplifier 24, whereas the burn-out circuit voltage will remain. The burn-out circuit voltage is so arranged that under these circumstances it drives the output signal of the converter 10 either to its minimum or its maximum value quickly, depending upon the burn-out indication desired. If the process is on automatic control, the polarity of the burn-out circuit voltage selected ordinarily will be such as to cause the automatic controller to shut down the process being controlled. Alternatively, the maximum or minimum output of the converter under burn-out conditions may be utilized to operate conventional alarm circuitry or to effect other changes in the process until repairs have been made.

The mercury-cadmium cell 60 has the advantage that it maintains an extremely constant voltage for very long periods of time without maintenance. In addition, it produces no electrical noise. This is an important advantage over previous burn-out protection circuits which use the rectification of AC power supply voltages to provide the burn-out signal, and at the same time, introduces considerable amounts of electrical noise.

The low-level thermocouple difference voltage is conducted to the input winding 72 of balanced magnetic amplifier 24 through a filter network 70 tuned to 120 cycles (twice the supply frequency). This filter, together with the associated electrolytic capacitor, filters out series induced AC noise signals in the thermocouple leads, and also prevents 120 cycle signals induced in the control winding 72 from being coupled into the input circuit comprising networks 34, 36 and 38. This further improves the accuracy and stability of the instrument.

Balanced magnetic amplifier 24 is of novel design and basically is described in detail in my co-pending U.S. patent application Ser. No. 378,132 filed on June 26, 1964, now U.S. Patent 3,351,851, granted on Nov. 7, 1967. Briefly, amplifier 24 comprises a pair of toroidal cores 74 and 76, each of which has a bias winding 78 or 80, and a pair of output windings 82 and 84 or 86 and 88. The four output windings are interconnected and energized through diodes 90, 92, 94 and 96 in a unique "criss-cross" circuit arrangement. The rectified output of amplifier 24 is smoothed by a load circuit 106 including parallel capacitors to give a steady DC output of either polarity, depending on the direction of current flow through winding 72. Amplifier 24 is very sensitive to low-level input signals, and yet is practically unaffected by ambient temperature and line voltage changes. The symmetrical construction of this amplifier is particularly advantageous in providing a very high common mode rejection, i.e. rejection of unwanted signals developed between the thermocouple and ground.

Amplifier 24 is provided with "clipped" AC voltage from a power supply 97 (see FIGURE 2) which includes a center-tapped secondary winding 98 of power transformer 42. The positive and negative peaks of the voltage appearing across secondary winding 98 are clipped by means of a pair of cathode-connected Zener diodes 100 each of whose anode is connected through a limiting resistor 101 to one end terminal or winding 98. Thus, a square-wave voltage signal is supplied to the output windings of amplifier stage 24. Since the clipping level is essentially constant, this power supply provides a stable A-C energizing voltage which is not affected by fluctuations in the AC line supply, typically 120 volt 60 c.p.s., and thus minimizes the need for line voltage regulation. Preferably, a separate clipped square-wave voltage supply 102 or 104, each of which is substantially identical to power supply 97, is provided for each of the other magnetic amplifiers 26 and 28, in order to reduce the effects of line voltage fluctuations at each of the subsequent stages, and also to minimize interstage coupling through the power supply circuit.

The amplified signal from first stage amplier 24 is transmitted to the series-connected input windings 108 to 110 of magnetic amplifiier 26. Amplifier 26 includes a bias winding 112 which is energized from the regulated power supply 38, an anti-hunt feedback winding 114, another feedback winding 116, and individually-wound output windings 118 and 120.

Amplifier 26 produces a steady DC output signal which is opposed by a bucking DC bias signal from rectifier network 122. Feedback lead 44 is connected into network 122 and supplies a negative feedback voltage signal composed of a fixed bias voltage component and a variable component proportional to the variable input signal. This feedback signal stabilizes the input amplifier 16 and maintains the effective input impedance seen by the thermocouple at a very high level so as to reduce the magnitude of current drawn from the thermocouple.

The output signal of amplifier 26 is applied to an input winding 128 (see FIGURE 2) of magnetic amplifier 28 through leads 124 and 126. Magnetic amplifier 28 is of conventional design and has a bias winding 130, a first feedback winding 132, a second feedback winding 134, and load windings 136 and 138. The load windings 136 and 138 are energized by regulated square-wave supply 104 through diodes 140 and 142. The output signals from amplifier 28 are applied to a load circuit 144 which smooths the output wave and converts it into a steady DC signal.

The DC signal from load circuit 144 is applied through a resistor 148 to the base electrode of the transistor 146 of transistor amplifier circuit 30. The emitter of transistor 146 is connected to the base electrode of the transistor 150 of amplifier circuit 32.

In accordance with one aspect of the present invention, the DC supply for transistor amplifiers 30 and 32 is provided by a Zener-diode-regulated supply comprising a full-wave rectifier and filter network 152 (see FIGURE 2), a small series resistor 154, and a Zener diode 156 connected across the output terminals 158 and 160 of this network. A principal purpose of this Zener diode is to reduce supply voltage fluctuations resulting from normal noise or other variations in the AC supply line.

Terminal 158 of the DC supply is connected through a current-limiting resistor 162 to a junction between one terminal of an arc-prevention resistor 164 and a filter capacitor 166. The opposite plate of capacitor 166 is connected to one output terminal 20 of the instrument, and the remote end of resistor 164 is connected to the other instrument output terminal 22.

The lower terminal 160 of the Zener-regulated DC supply is connected through feedback winding 134 of magnetic amplifier 28 and through a small series resistor 168 to the emitter lead 170 of transistor 150. Thus, the return path from the Zener-regulated supply flows through the feedback winding 134 of amplifier 28 so as to conduct a negative current feedback signal into amplifier 28. This current feedback signal stabilizes output amplifier 18 and ensures that its output current level is almost unaffected by load impedance changes. For example, short-circuiting load terminals 20 and 22 has little effect on the output current level.

Advantageously, a negative feedback signal proportional to output current is developed across resistor 168. This signal is applied to winding 130 of the amplifier 28 through a resistor 169 and a capacitor 171 to provide "anti-hunt" AC feedback. A D.C. feedback signal also is supplied to winding 130 from rectifying network 152 to compensate for variations in the supply voltage.

A high-frequency negative feedback loop is provided for the first transistor amplifier 30. This loop consists of a resistor 172 in series with a capacitor 173 connected to the base electrode of transistor 146. The values of resistor 172 and capacitor 173 are selected so that the feedback loop provides a low impedance to high-frequency noise signals but blocks the flow of low frequency signals. This has the effect of greatly reducing the noise level on the output signal without substantially affecting the amplification of direct current signals.

Similar noise filtering is provided by the negative feedback action of the anti-hunt circuits 114 and 169, 171 in the preceding magnetic amplifier stages 26 and 28. These circuits are arranged to provide a cut-off frequency lower than actually required solely for stability purposes, in order to minimize the transmission of noise. The noise suppression effects are, however, predominantly provided by circuit 172, 173, and the use of transistors in place of a magnet amplifier at this stage is especially beneficial because transistors have a much faster response time characteristic, thus tending to enhance the noise reduction produced by the negative feedback action.

The transformer 42 (FIGURE 2) has two sets of insulated shields 174 and 176 between windings. Shielding 174 is located adjacent the 120 volt power supply and is connected to the metal case enclosing converter 10. This shielding thus also provides a safety feature since in the event of insulation breakdown, the line current will flow immediately to ground through the low-resistance connection and thereby blow out the line fuse.

The shielding 176 adjacent the secondary windings of transformer 142 is connected to a metal "ground plane shield" which forms a "chassis ground" located inside the metal case and conductively isolated from the case. The inter-component wiring for the entire instrument is on the usual circuit board and thus is located in what is essentially a single plane. The ground plane shield is positioned immediately adjacent the wiring plane so as to further reduce the potential variations in that wiring due to noise influences. This arrangement particularly substantially eliminates the deleterious effect of AC thermocouple voltages relative to case ground, eliminates 60-cycle "pick-up" which would occur due to ground currents flowing in the case, and provides safety for operating personnel. The provision of such isolated shielding aids in enhancing the overall accuracy of the converter 10.

The converter 10 is extremely sensitive, stable and accurate. It will sense and register an input voltage change of the order of one or two hundredths of a micro-volt, i.e. one or two one hundred-millionths of a volt. With input voltages ranging over a full scale of only two millivolts, it will produce output currents of from 10 to 50 milliamperes. The current gain of the amplifier 10 is about five million with both major feedback loops for the amplifiers 16 and 18 open, and is about twelve thousand with both of those feedback loops closed.

Even with this sensitivity and current gain, the converter 10 is extremely stable and accurate. For example, a converter constructed as described herein was accurate to within $\frac{1}{10}$ of one percent despite wide ambient temperature variations, line voltage variations of plus or minus ten percent, or line frequency variations within the range of from 48 to 62 c.p.s.

The output current signal has an extremely low noise level due in part to the high-frequency negative feedback loop in transistor amplifier 30. Interstage isolation is especially enhanced by the use of individual clipped AC supplies for each magnetic amplifier. Another noise source is eliminated by the use of the cell 60 in the burn-out protection circuit 58.

The use of the Zener diode 156 as a regulator in the transistor amplifier power supply and feedback loop for amplifier 18 adds stability to the output current and prevents the build-up of transient currents to dangerous levels. It provides a safety feature in that if the connections to load 68 are accidentally broken, path for transient currents is provided and arcing at terminals 20 and 22 is reduced to a negligible value. Such arcing has in the past presented a difficult operating problem, particularly where inductive loads are used. In this regard, the problem of arcing is further reduced in the present design by utilizing a construction which eliminates the need for filter chokes in the output.

The above description of the invention is intended to be illustrative and not limiting. Various changes or modifications in the embodiments described may occur to those skilled in the art and these can be made without departing from the spirit or scope of the invention as limited by the prior art.

I claim:

1. An electronic converter instrument for use with industrial process instrument systems of the type where a very low-level electrical voltage signal, such as produced by a thermocouple, is to be translated into a relatively high-powered current output signal of corresponding magnitude, said converter comprising, in combination, an input circuit to receive the low level voltage signal, a first amplifier stage including balanced magnetic amplifier apparatus connected to said input circuit, means for providing feedback from the output of said first amplifier stage to said input circuit; a second amplifier stage coupled to the output of said first amplifier stage, said second stage including, as a first sub-stage, a magnetic amplifier, and, as a last sub-stage, a transistor amplifier, and means for providing feedback from the output of said last sub-stage transistor amplifier stage to the input of said first sub-stage magnetic amplifier.

2. Apparatus as claimed in claim 1, including a voltaic cell-energized direct-current supply connected to said first stage input circuit to provide a suitable low-level input signal thereto in the event that an open circuit develops in the element normally supplying the low-level voltage signal to be measured.

3. Apparatus as in claim 2 including voltaic cell connected in series with said input terminal means for bucking-out input voltage signals to the extent necessary to equal the voltage supplied by said direct current supply.

4. Apparatus as in claim 3 in which said voltaic cell is a mercury-cadmium cell.

5. Apparatus as in claim 1 in which the feedback in said first amplifier stage is voltage feedback and the feedback in said second amplifier stage is current feedback.

6. Apparatus as in claim 5 in which said second amplifier stage includes another transistor amplifier sub-stage connected between said first and last sub-stages.

7. Apparatus as in claim 6 including means for providing feedback of high-frequency signals from the output to the input of said other transistor amplifier.

8. Apparatus as in claim 1 in which said first stage balanced magnetic amplifier apparatus includes a pair of cores of magnetic material, an input winding common to both cores, a bias winding, and two load windings for each of said cores, and a diode connecting an alternating current source to each of said load windings, said load windings being interconnected in the criss-cross pattern described herein.

9. Apparatus as claimed in claim 1, wherein said last sub-stage transistor amplifier additionally includes negative feedback means between its output and its input, said negative feedback means including frequency-selective circuit means arranged to discriminate in favor of higher frequency signals, thereby to reduce the overall noise characteristics of said apparatus.

10. Apparatus as claimed in claim 9, wherein at least one other of the amplifier stages preceding said transistor stage includes negative feedback means coupling the output of said one other stage to the input thereof to aid in reducing noise in the converter output.

11. Apparatus for amplifying low-level electrical voltage signals and converting them into current signals, said apparatus comprising, in combination, a first amplifier stage including balanced magnetic amplifier apparatus, means for providing feedback from the output to the input of said first amplifier stage, a second amplifier stage connected to said first amplifier stage, said second stage including, as a first sub-stage, a magnetic amplifier having a winding, and, as a last sub-stage, a transistor amplifier, a Zener-diode-regulated direct current power supply for said last sub-stage transistor amplifier, and means for providing feedback from the output of said last sub-stage transistor amplifier to said first sub-stage magnetic amplifier.

12. Apparatus as in claim 11 in which said Zener-diode-regulated supply is connected in series with said winding of said first sub-stage magnetic amplifier and a feedback-signal developing network to provide negative current feedback in said second amplifier stage.

13. Apparatus for amplifying low-level electrical voltage signals and converting them into current signals, said apparatus comprising, in combination, a first amplifier stage including balanced magnetic amplifier apparatus having load windings, means for providing feedback from the output to the input of said first amplifier stage, a second amplifier stage connected to said first amplifier stage, said second stage including, as a first sub-stage, a magnetic amplifier, and, as a last sub-tsage, a transistor amplifier, a power supply transformer, first and second secondary windings on said transformer, first and second means for clipping the positive and negative peaks of the voltage wave appearing across each of said secondary windings, and means for conducting the clipped voltage from said first secondary winding to the load windings of said balanced magnetic amplifier apparatus of said first stage, and for conducting the clipped voltage from said second secondary winding to the load windings of the magnetic amplifier of said first sub-stage of said second amplifier stage, and means for providing feedback from the output of said last sub-stage transistor amplifier to said first sub-stage magnetic amplifier.

14. Apparatus for converting a low-level voltage signal to a high-level amplifier current signal, said apparatus comprising, as a first stage, a criss-cross balanced magnetic amplifier, and a self-saturating magnetic amplifier as a second stage with its input coupled to the output of said first stage, a first feedback network for developing a voltage proportional to the output signal of said second stage amplifier and applying said voltage to the input of said criss-cross amplifier in a series opposition to the voltage signal input thereto, another self-saturating magnetic amplifier as a third stage and including a feedback winding, the input of said third stage being coupled to the output of said second stage, a transistor amplifier as a fourth stage with its input coupled to the output of said fourth stage, another transistor amplifier as a fifth and last stage with its input coupled to the output of said fourth stage, and a second feedback network for developing a current signal proportional to the output of said fifth stage and applying said current signal to said feedback winding of said third stage magnetic amplifier to develop a magnetic flux opposing the flux developed in said third stage magnetic amplifier by the signal applied thereto from said second stage magnetic amplifier.

15. Apparatus as in claim 14 in which said second feedback network includes a direct current source having terminals between which a Zener diode is connected, said terminals being connected in series in said second feedback network, said direct current source serving as a power supply for said fourth and fifth stage transistor amplifiers.

16. Apparatus as in claim 14 wherein said transistors comprise collector and base electrodes, including a series resistor and capacitor combination connected between the collector and base electrodes of a transistor in said fourth stage transistor amplifier, said resistor and capacitor combination providing a relatively low impedance to high-frequency electrical noise signals and a relatively high impedance to low-frequency alternating signals.

17. Apparatus as in claim 14 including a power supply transformer, one separate center-tapped secondary winding on said transformer for each of said first, second and third stage amplifiers, three clipping networks, each comprising a pair of cathode-connected Zener diodes connected between the remote leads of one of said secondary windings, and a resistor connected in series between the anode of each of said Zener diodes and one remote terminal of one of said secondary windings, said first, second and third stage amplifiers each having a load windings, each of said clipping networks being connected to the load windings of one of said first, second and third stage amplifiers.

18. Apparatus as in claim 14 including a transformer with primary and secondary windings, shielding means located between the windings of said transformer, said shielding means including a first shield adjacent said primary winding of said transformer, said first shield being electrically connected to the metal case enclosing said apparatus, and a second shield adjacent the secondary windings of said transformer, said second shield being electrically connected to a metalic ground plane member within but conductively isolated from said case.

References Cited

UNITED STATES PATENTS

| | | | |
|---|---|---|---|
| 2,798,904 | 7/1957 | Alexanderson | 330—3 X |
| 3,016,493 | 1/1962 | Darling | 330—8 |
| 3,180,974 | 4/1965 | Darling | 219—497 |
| 3,196,255 | 7/1965 | Beauchamp et al. | 219—497 |

JOHN F. COUCH, *Primary Examiner.*

W. E. RAY, *Examiner.*